(12) United States Patent
Surmeli et al.

(10) Patent No.: US 9,414,570 B2
(45) Date of Patent: Aug. 16, 2016

(54) DEVICE FOR PAW AND AFTER-RELIEF CLEANING OF PETS (CATS AND DOGS)

(76) Inventors: Yagmur Surmeli, Istanbul (TR); Yaprak Surmeli, Istanbul (TR)

(*) Notice: Subject to any disclaimer, the term of this patent is extended or adjusted under 35 U.S.C. 154(b) by 220 days.

(21) Appl. No.: 14/240,603

(22) PCT Filed: Feb. 24, 2012

(86) PCT No.: PCT/TR2012/000037
§ 371 (c)(1),
(2), (4) Date: May 5, 2014

(87) PCT Pub. No.: WO2013/028139
PCT Pub. Date: Feb. 28, 2013

(65) Prior Publication Data
US 2014/0352629 A1 Dec. 4, 2014

(30) Foreign Application Priority Data
Aug. 23, 2011 (TR) .................. 2011 08427

(51) Int. Cl.
*A01K 13/00* (2006.01)
(52) U.S. Cl.
CPC .............. *A01K 13/001* (2013.01); *A01K 13/002* (2013.01)
(58) Field of Classification Search
CPC ..................... A63B 2047/046; A01K 13/001
USPC ................... 119/609, 673, 600, 664, 652; 15/104.92, 21.2, 22.2, 161
See application file for complete search history.

(56) References Cited

U.S. PATENT DOCUMENTS

| | | | | |
|---|---|---|---|---|
| 4,011,621 A * | 3/1977 | Irvine | A47L 15/0068 | 15/104.92 |
| 6,065,431 A * | 5/2000 | Davis | A01K 13/001 | 119/600 |
| 6,745,721 B1 * | 6/2004 | Hammer | A01K 13/001 | 119/664 |
| 6,851,391 B1 * | 2/2005 | Mulich | A01K 13/001 | 119/651 |
| 7,302,915 B2 * | 12/2007 | Leary | A01K 13/001 | 119/600 |
| 8,371,247 B2 * | 2/2013 | Fleming | A01K 13/001 | 119/652 |
| 8,474,408 B2 * | 7/2013 | Leary | A01K 13/001 | 119/600 |
| 2002/0152568 A1 * | 10/2002 | Dillinger | E04F 21/16 | 15/104.92 |
| 2006/0185616 A1 * | 8/2006 | Leary | A01K 13/001 | 119/673 |
| 2014/0326193 A1 * | 11/2014 | Plummer | A01K 13/001 | 119/651 |

FOREIGN PATENT DOCUMENTS

| | | |
|---|---|---|
| DE | 20212476 U1 | 12/2003 |
| JP | 2011182770 A | 9/2011 |
| WO | 2004062357 A1 | 7/2004 |

OTHER PUBLICATIONS

International Search Report for corresponding International Application No. PCT/TR2012/000037.

* cited by examiner

*Primary Examiner* — Kristen C Hayes
(74) *Attorney, Agent, or Firm* — Egbert Law Offices, PLLC

(57) ABSTRACT

A device for paw and after-relief cleaning of pets (cats or dogs), has an outer body, a charger unit, a motor, a clean water tank, a clean water pump, a filling plug, a clean water pipe, a vertical brush, a horizontal brush, an interior body, pulverization heads, an apparatus, an on/off button, a rechargeable battery unit, a transmission gear, a pulverization ring and clean water piping for pulverization heads in the pulverization ring.

13 Claims, 3 Drawing Sheets

DEVICE FOR PAW AND AFTER-RELIEF CLEANING OF PETS (CATS AND DOGS)

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to a device for paw and after-relief cleaning of pets (cats or dogs).

2. Description of Related Art Including Information Disclosed under 37 CFR 1.97 and 37 CFR 1.98

People keep cats or dogs in their homes. However, cat or dog care has always been a problem for people.

The paws of cats or dogs taken out walking get dirty. In addition, the anuses and genital organs of cats or dogs that relieve themselves outside also get dirty. Although people like to keep cats or dogs in their homes, such dirt causes a hygiene problem in houses.

When such pets (cats or dogs) arrive home they wander around the house in an uncontrolled manner and lay on sofas, beds, pillows, chairs, carpets, etc. Thus, dirt is carried by them to the house.

Today, people use wet napkins for paw and after-relief cleaning of their cats or dogs. However, it is obvious that it is not hygienic, it only allows a rough cleaning.

In addition, disinfectants are put in a container and the paws of the cat or dog are immersed in these disinfectants. And it is also obvious that this is not a hygienic application.

Document D1 (WO 2004/062357 A1) discloses a device suitable for paw and after-relief cleaning of pets (cats or dogs), wherein it comprises an outer body (103), charger unit (see 104), motor (5), clean water tank (1), clean water pump (4), filling plug (implicit, see filling hole (12)), clean water pipe (10), horizontal brush (8), interior body (2), pulverization heads (32), on/off button (implicit), rechargeable battery unit (51), pulverization ring and clean water piping (31) for pulverization heads (32) in the pulverization ring (31).

D2 (JP4725983) relates to an apparatus for washing the legs has rotary drive means whose shaft can rotates, a cylindrical container rotating by being connected to the shaft, and brushes on the inside of the container. To provide an apparatus tor washing pet's legs which is capable of easily washing all over the pet's legs in detail without wetting hands.

SUMMARY OF THE INVENTION

This invention relates to a device for paw and after-relief cleaning of pets (cats or dogs), which is developed for overcoming the abovementioned problems in the prior part.

This invention comprises an outer body, charger unit, motor, clean water tank, clean water pump, filling plug, clean water pipe, vertical brush, horizontal brush, interior body, pulverization heads, after-relief cleaning apparatus, on/off button, rechargeable battery unit, transmission gear, pulverization ring and clean/water piping for pulverization heads in the pulverization ring.

This invention cleans the anus and genital organs of the cat or dog with its vertical and horizontal brushes and pulverization rings in a hygienic manner.

This invention is a convenient product since it provides the required cleanness in one single run and in a very short time.

This invention is also a very affordable product since it consumes a very low amount of clean water and power.

In addition, this invention also allows disinfection through the use of a disinfectant agent, which will be added to the clean water in the clean water container.

BRIEF DESCRIPTION OF THE SEVERAL VIEWS OF THE DRAWINGS

For the purposes of this invention, a device for paw and after-relief cleaning of cats and dogs is embodied in the following figures.

Figure 1:
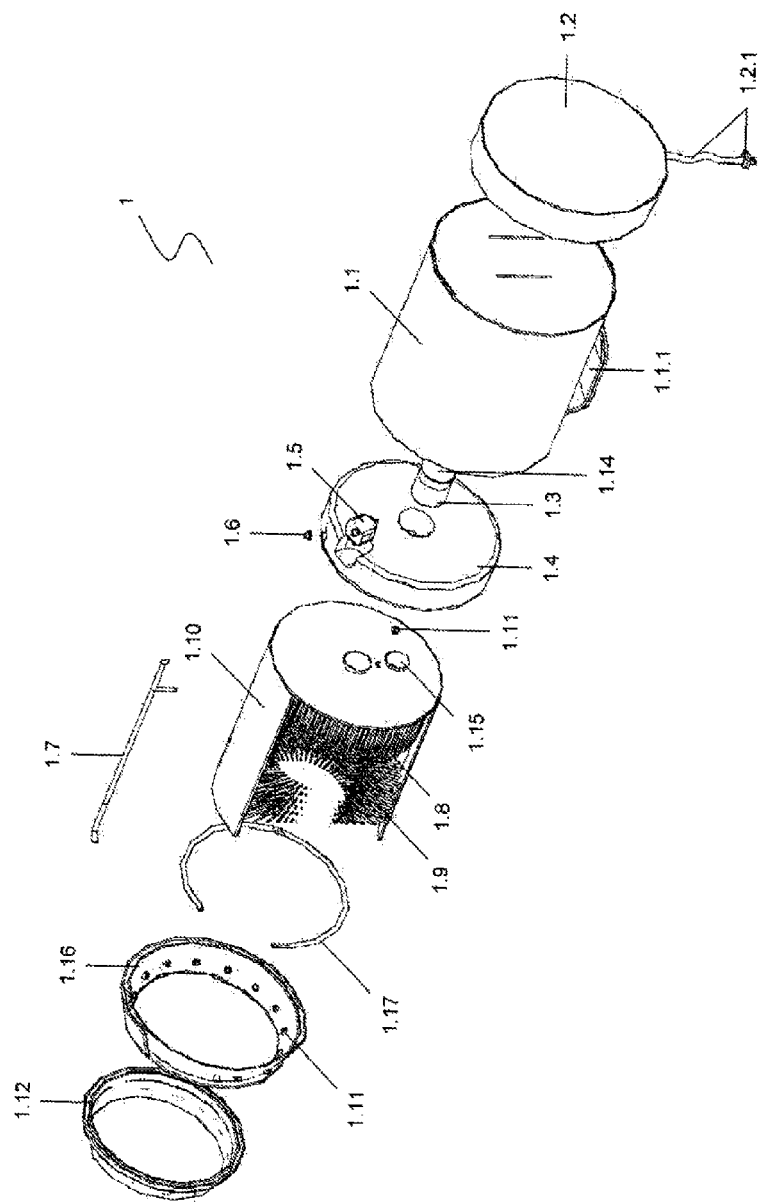
FIG. 1. Disassembled perspective view of the device according to this invention.
Figure 2:
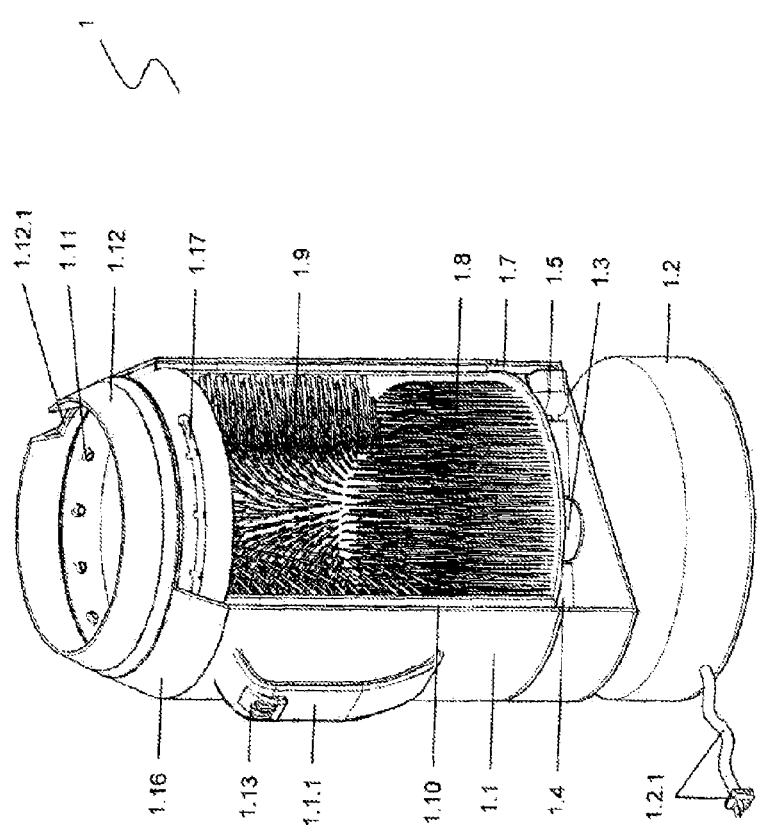
FIG. 2. Assembled, sectional perspective view of the device according to this invention.
Figure 3:
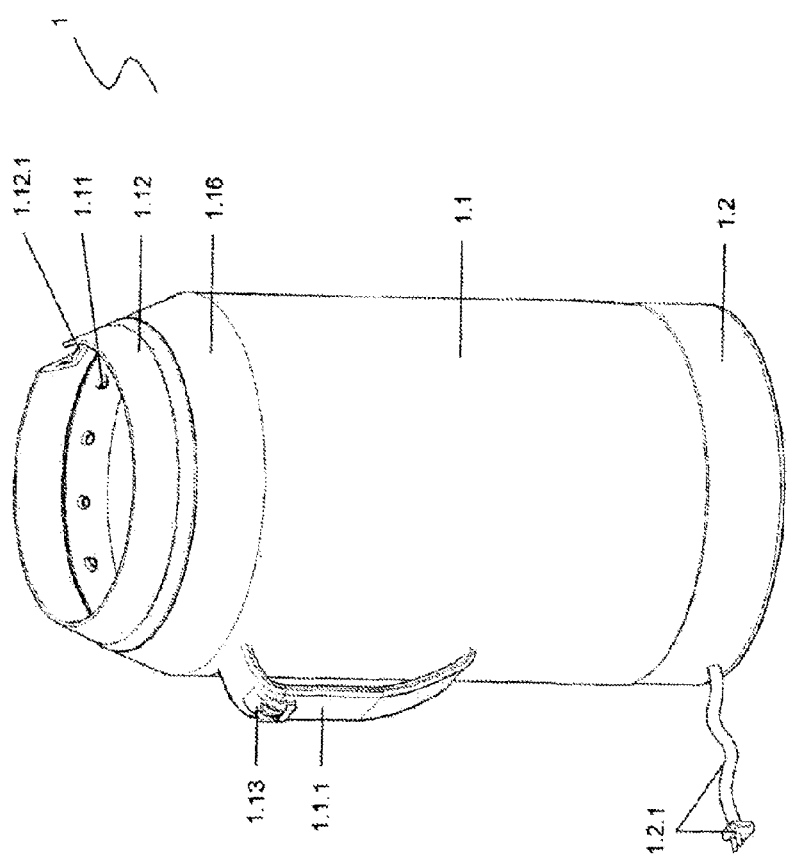
FIG. 3. Assembled perspective view of the device according to this invention.

Parts shown in the figures are numbered as follows:
1. Device for paw and after-relief cleaning of cats or dogs
1.1. Outer body
1.1.1. Handle
1.2. Charger unit
1.2.1. Adapter plug and cable
1.3. Motor
1.4. Clean water container
1.5. Clean water pomp
1.6. Filling plug
1.7. Clean water pipe
1.8. Vertical brash
1.9. Horizontal brush
1.10. Inferior body
1.11. Pulverization heads
1.12. Apparatus
1.12.1. Slit part
1.13. On/off button
1.14. Rechargeable battery unit
1.1.5. Transmission gear
1.1.6. Pulverization ring
1.17. Clean water piping for pulverization heads in the pulverization ring

DETAILED DESCRIPTION OF THE INVENTION

This invention relates to a device for paw and after-relief cleaning of pets (cats or dogs) (1), wherein, it comprises an outer body (1.1), charger unit (1.2), motor (1.3), clean water tank (1.4), clean water pump (1.5), filling plug (1.6), clean water pipe (1.7), vertical brush (1.8), horizontal brush (1.9), interior body (1.10), pulverization heads (1.11), apparatus (1.12), on/off button (1.13), rechargeable battery unit (1.14), transmission gear (1.15), pulverization ring (1.16) and clean water piping (1.17) for pulverization heads in the pulverization ring.

This invention comprises an outer body (1.1), on which all moving and stationary parts according to this invention are installed, which is installed on the charger unit (1.2) to charge the rechargeable battery unit (1.14) that supplies power to both the motor (1.3) and clean water pump (1.5).

This invention comprises a charger unit (1.2), which is connected to the mains through the adaptor plug and cable (1.2.1), on which the outer body (1.1) is installed to charge the rechargeable battery unit (1.14) that supplies power to the motor (1.3) and clean water pump (1.5).

This invention comprises a motor (1.3), which is powdered by the rechargeable battery unit (1.14) and allows rotating both the interior body (1.10) and the vertical brushes (1.8) and horizontal brushes (1.9) fixed to the interior body (1.10).

This invention comprises a clean water container (1.4), which is filled with clean water.

This invention comprises a clean water pump (1.5), which is powered by the rechargeable battery unit (1.14) and pumps the clean water from the clean water container (1.4) to the clean water pipe (1.7).

This invention comprises a filling plug (1.6), which allows sealing the clean water container (1.4) after filling the clean water container (1.4) with clean water.

This invention comprises a clean water pipe (1.7), through which the clean water from the clean water container (1.4) is pumped to the pulverization heads (1.11) by the clean water pump (1.5).

This invention comprises vertical brushes (1.8), which are fixed to the bottom of the interior body (1.10) and perform cleaning.

This invention comprises horizontal brushes (1.9), which are fixed to the sides of the interior body (1.10) and perform cleaning.

This invention-comprises an interior body (1.10) with vertical brushes (1.8) at the bottom and horizontal brushes (1.9) at sides, which is rotated by the motor (1.3).

This invention comprises pulverization heads (1.11), which spray the clean water carried by the clean water pipe (1.7) to the interior body (1.1.0) and apparatus (1.12).

This invention comprises an apparatus (1.12), which is installed on the outer body (1.1) for after-relief cleaning and equipped with a split part (1.12.1) for inserting the base of the tail, of the cat or dog and discharging the dirty water from the interior body (1.10).

This invention comprises ah on/off button (1.13), which is installed on the handle (1.1.1) of the outer body (1.1) and has two positions, one for switching on/off the motor (1.3) and the other for switching on/off the clean water pump (1.5).

This invention comprises a rechargeable battery unit (1.14), which supplies power to both the motor (1.3) and the clean water pump (1.5) and is charged by installing the outer body (1.1) to the charger unit (1.2).

This invention comprises a transmission gear (1.15), which transmits the motion from the motor (1.3) to the interior body (1.10).

This invention comprises a pulverization ring (1.16), in which the pulverization heads (1.11) are installed.

This invention comprises a clean water piping (1.17) for pulverization heads in the pulverization ring, which carry the clean water to the pulverization heads (1.11) in the pulverization ring (1.16).

Installation of the device for paw and after-relief cleaning of cats or dogs (1)

Motor (1.3), rechargeable battery trait (1.14) integrated with the motor (1.3), clean water pomp (1.5) with one end of the clean water pipe (1.7) connected to its clean water output and clean water container (1.4) with the clean water inlet of the clean water pump (1.5) connected to it are installed at their respective locations at the interior and bottom parts of the outer body (1.1) and the on/off button (1.13) is installed on its handle (1.1.1). In addition, cables of the on/off button (1.13) are connected to both the motor (1.3) and clean water pump (1.5). The filling ping (1.6) of the clean water container (1.4) is installed at its place on the outer body (1.1). Interior body (1.10) with vertical brushes (1.8) installed at its bottom and horizontal brushes (1.9) at both its sides is set on the transmission gear (1.15) on the motor (1.3) shaft. One end of the clean water pipe (1.7) is connected to the pulverization head (1.11) located at the bottom of the interior body (1.10). And the other end of the clean water pipe (1.7) is connected to the clean water piping (1.17) for pulverization heads in the pulverization ring and the pulverization ring (1.16) is installed on the device (1). A split part (1.12.1) is installed such that it is located as opposing the handle (1.1.1) of the outer body (1.1) and the apparatus (1.12) is installed, on the pulverization ring (1.16) and thereby the installation is completed.

Operating Principle of the Device for Paw and After-Relief Cleaning of Cats or Dogs (1)

For paw-cleaning of cats or dogs:

The filling plug (1.6) is removed, the clean water container (1.4) is filled with clean water and the filling plug (1.6) is installed. Both positions of the on/off button (1.13) installed on the handle (1.1.1) of the outer body (1.1) are set to on and both the motor (1.3) and the clean water pump (1.5) are energized. The motor (1.3) allows rotating the interior body (1.10) and the vertical brushes (1.8) and horizontal brushes (1.9) fixed to the interior body (1.10). And the clean water pump (1.5) pumps the clean water from the clean water container (1.4) to both the pulverization head (1.11) at the bottom of the interior body (1.10) and the pulverization heads (1.11) in the pulverization ring (1.16) through the clean water piping (1.7). And the clean water pulverized by the pulverization heads (1.11) in the pulverization ring (1.16) moistens both the vertical brushes (1.8) and the horizontal brushes (1.9). Both the vertical brushes (1.8) and horizontal brushes (1.9) moisten and clean the paws of the cat or dog by rotating. In addition, the pulverization head (1.11) at the bottom of the interior body (1.10) pulverizes clean water under the paws of the cat or dog to clean them.

For after-relief cleaning of cats or dogs:

If there is no clean-water in the clean water container (1.4), the filling plug (1.6) is removed, clean water container (1.4) is filled with clean water and filling-plug (1.6) is installed. The split part (1.12.1) is installed such that it is located as opposing the handle (1.1.1) of the outer body (1.1) and the apparatus (1.12) is installed on the pulverization ring (1.16). Only one position of the on/off button (1.13) installed, on the handle (1.1.1) of the outer body (1.1) is set to on and the clean water pump (1.5) is energized. The clean water pump (1.5) pumps the clean water from the clean water container (1.4) to both the pulverization head (1.11) at the bottom of the interior body (1.10) and the pulverization heads (1.11) in the pulverization ring (1.16) through the clean water piping (1.7). The base of the tail of the cat or dog is inserted into the split part (1.12.1) of the apparatus (1.12) to pulverize clean water to the anus or genital organ of the cat or dog for cleaning purposes.

The device (1) can be powered from the rechargeable battery unit (1.14) or by connecting the adapter plug and cable (1.2.1) of the charger unit (1.2) to the mains.

Parts of the device (1) can be installed in different ways (by mating or using tabs etc.) to build the device (1).

The invention claimed is:

1. A device for paw and after-relief cleaning of pets, the device comprising:
   an outer body;
   a charger unit;
   a rechargeable battery unit cooperative with said charger unit;
   an interior body having vertical brushes at a bottom thereof and horizontal brushes at sides thereof, said interior body positioned within said outer body;
   a motor powered by said charger unit, said motor cooperative with said interior body so as to as to rotate said interior body;
   a clean water container in fluid communication with said interior body and positioned within said outer body;
   a clean water pump located within said clean water tank;
   a vertical plug received within a hole in said clean water container;
   a clean water pipe in fluid communication with said clean water container, said clean water pump adapted to pump clean water from said clean water container into said clean water pipe;
   pulverization heads positioned at an end of said outer body;
   an apparatus positioned at a side of said pulverization heads, said apparatus having a split part adapted to allow a base of a tail of the pet to be inserted therein and to allow a discharge of dirty water from said interior body;
   an on/off button positioned exterior of said outer body and cooperative with said motor unit;
   a transmission gear cooperative with a shaft of said motor and with said interior body so as to transmit motion of said motor to said interior body; and
   a pulverization ring connected to said clean water pipe such that said clean water pipe passes clean water to said pulverization heads.

2. The device of claim 1, said outer body being installed onto said charger unit.

3. The device of claim 1, said charger unit having an adapter plug and a cable, said adapter plug and cable adapted to be connected to a utility mains so as to supply power to said charger unit.

4. The device of claim 1, said clean water container being filled with clean water.

5. The device of claim 1, said clean water pump being powered by said rechargeable battery unit.

6. The device of claim 1, said vertical plug being a filling plug in removably sealed relation with said hole of said clean water container.

7. The device of claim 4, said clean water pump adapted to pump the clean water from said clean water container to said pulverization head.

8. The device of claim 1, said vertical brushes being affixed to said bottom of said interior body.

9. The device of claim 1, said horizontal brushes being affixed to the sides of said interior body.

10. The device of claim 1, said pulverization head adapted to spray clean water carried by said clean water pipe into said interior body and said apparatus.

11. The device of claim 1, said outer body having a handle extending outwardly therefrom, said on/off button being installed on said handle, said on/off button having a pair of positions, one of said pair of positions for switching said motor on or off, another of said pair of positions for switching said clean water pump on or off.

12. The device of claim 1, said rechargeable battery unit being charged by installing said charger unit onto said outer body.

13. The device of claim 1, said pulverization heads being installed on said pulverization ring.

* * * * *